(12) United States Patent
Balak et al.

(10) Patent No.: US 10,997,535 B1
(45) Date of Patent: May 4, 2021

(54) SYSTEM, METHOD, AND COMPUTER PROGRAM FOR PREDICTING DELAYS IN DELIVERING A PROJECT TO A CUSTOMER

(71) Applicant: Amdocs Development Limited, Limassol (CY)

(72) Inventors: Yuval Balak, Ra'ananna (IL); Suha Bshara, Nazareth (IL); Qays Abou Housien, Nazareth (IL); Shalom Weiss, Nazareth (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 56 days.

(21) Appl. No.: 16/044,434

(22) Filed: Jul. 24, 2018

(51) Int. Cl.
- G06Q 10/06 (2012.01)
- G06N 20/00 (2019.01)
- G06N 3/04 (2006.01)

(52) U.S. Cl.
CPC ....... *G06Q 10/063114* (2013.01); *G06N 3/04* (2013.01); *G06N 20/00* (2019.01)

(58) Field of Classification Search
CPC ..... G06Q 10/06313; G06Q 10/063114; G06Q 10/06–06398; G06N 20/00; G06N 3/02–105; G06F 11/3664; G06F 8/00
USPC ........................................................ 717/102
See application file for complete search history.

(56) References Cited

U.S. PATENT DOCUMENTS

| | | |
|---|---|---|
| 6,519,763 B1 | 2/2003 | Kaufer et al. |
| 6,738,746 B1 | 5/2004 | Barnard et al. |
| 8,006,223 B2 | 8/2011 | Boulineau et al. |
| 8,285,578 B2 | 10/2012 | Sheppard |
| 9,268,674 B1 | 2/2016 | Ben-Cnaan |
| 2002/0103731 A1 | 8/2002 | Barnard et al. |
| 2004/0153354 A1* | 8/2004 | Nonaka ............... G06Q 10/04 705/7.17 |
| 2005/0027578 A1* | 2/2005 | Chambers, Jr. ........ G06Q 10/06 705/7.12 |

(Continued)

OTHER PUBLICATIONS

Choetkiertikul et al., "Predicting the delay of issues with due dates in software projects", Jan. 19, 2017, Springer Science+Business Media New York 2017, 1223-1263.*

(Continued)

*Primary Examiner* — Todd Aguilera
(74) *Attorney, Agent, or Firm* — Zilka-Kotab, P.C.

(57) ABSTRACT

A system, method, and computer program product are provided for predicting delays in delivering a project to a customer. In operation, a system identifies one or more go-live milestones associated with a software project. The system receives information from a plurality of project management systems that are managing a governance process of the software project. The system determines whether there are any potential delays and associated magnitudes in accomplishing the one or more go-live milestones based on the information by utilizing a machine learning algorithm that implements a first analytic layer that analyzes static variables and a second analytic layer that analyzes dynamic variables. The system correlates and combines results from the first analytic layer and the second analytic layer upon every upload of new information. The system outputs information associated with any determined potential delays in accomplishing the one or more go-live milestones.

5 Claims, 5 Drawing Sheets

(56) References Cited

U.S. PATENT DOCUMENTS

| | | |
|---|---|---|
| 2006/0265255 A1 | 11/2006 | Williams |
| 2008/0082378 A1 | 4/2008 | Duncan et al. |
| 2008/0126165 A1* | 5/2008 | Buchner ............... G06Q 10/06 705/7.15 |
| 2008/0126945 A1 | 5/2008 | Munkvold et al. |
| 2008/0140485 A1 | 6/2008 | Williams |
| 2014/0278721 A1* | 9/2014 | Giles ............... G06Q 10/06313 705/7.26 |
| 2014/0344775 A1* | 11/2014 | Dunne ............... G06Q 10/06 717/101 |
| 2014/0372973 A1* | 12/2014 | Urdang ............... G06F 9/4494 717/108 |
| 2015/0072332 A1 | 3/2015 | Lin et al. |

OTHER PUBLICATIONS

Specht, D., "A General Regression Neural Network", 1991, IEEE Transactions on Neural Networks. vol 2. No. 6. Nov. 1991, p. 568-576.*

Lachlan, R., et al., "Three dimensional matrices: practical usage", StackOverflow [online], 2009 [retrieved Aug. 20, 2020], Retrieved from Internet: <URL: https://stackoverflow.com/questions/531259/three-dimensional-matrices-practical-usage>, pp. 1-4.*

Anonymous, Artificial Neuron, Wikipedia [online], May 2018 [retrieved Mar. 11, 2021], Retrieved from Internet: <URL: https://web.archive.org/web/20180526094802/https://en.wikipedia.org/wiki/Artificial_neuron>, pp. 1-6.*

\* cited by examiner

SYSTEM, METHOD, AND COMPUTER PROGRAM FOR PREDICTING DELAYS IN DELIVERING A PROJECT TO A CUSTOMER

FIELD OF THE INVENTION

The present invention relates to a system for predicting delays in delivering a project to a customer, and more particularly to predicting potential delays in accomplishing one or more go-live milestones.

BACKGROUND

Go-live is the time at which something becomes available for use. In software development, for example, go-live is the point at which code moves from a test environment to a production environment. Currently, predicting whether a company is going to meet a go-live milestone in a project requires manual effort from a project management team.

There is thus a need for addressing these and/or other issues associated with the prior art.

SUMMARY

A system, method, and computer program product are provided for predicting delays in delivering a project to a customer. In operation, a system identifies one or more go-live milestones associated with a software project. The system receives information from a plurality of project management systems that are managing a governance process of the software project. The system determines whether there are any potential delays and associated magnitudes in accomplishing the one or more go-live milestones based on the information by utilizing a machine learning algorithm that implements a first analytic layer that analyzes static variables and a second analytic layer that analyzes dynamic variables. The system correlates and combines results from the first analytic layer and the second analytic layer upon every upload of new information. The system outputs information associated with any determined potential delays in accomplishing the one or more go-live milestones.

DETAILED DESCRIPTION

Figure 1:
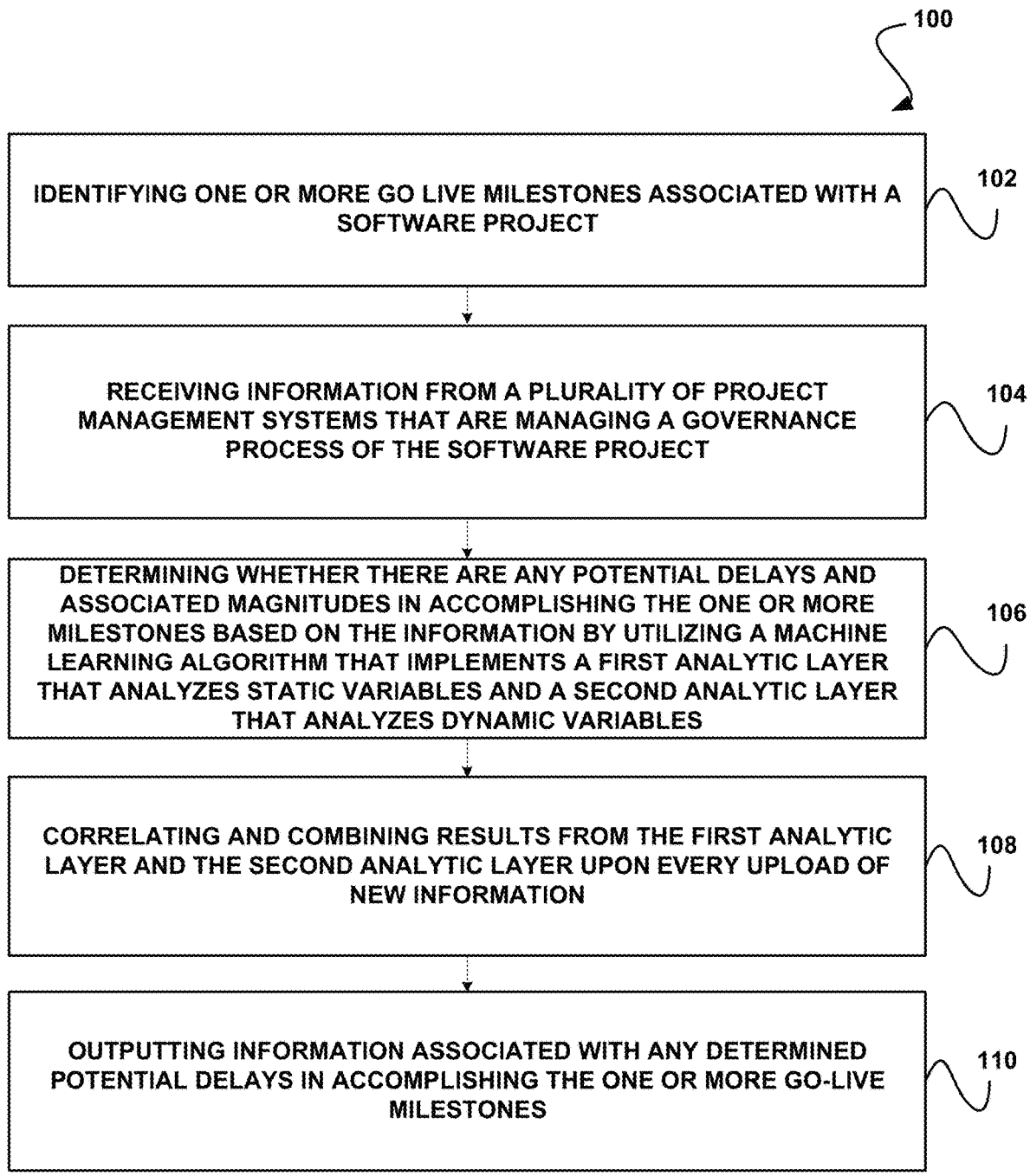
FIG. 1 illustrates a method for predicting delays in delivering a project to a customer, in accordance with one embodiment.

FIG. 1 illustrates a method 100 for predicting delays in delivering a project to a customer, in accordance with one embodiment.

In operation, a system identifies one or more go-live milestones associated with a software project. See operation 102. The software project may be associated with any industry. For example, in one embodiment, the software project may be associated with the telecommunication industry.

Go-live is the time at which something becomes available for use. In software development, go-live is the point at which code moves from the test environment to the production environment. The go-live milestones may be associated with any milestone or step required to move the software project from the test environment to the production environment.

The system receives information from a plurality of project management systems that are managing a governance process of the software project. See operation 104. The information may be associated with any aspect of a particular milestone, such as date information, resource information, requirement information, etc. In one embodiment, the information may include the go-live milestones.

The system determines whether there are any potential delays and associated magnitudes in accomplishing the one or more go-live milestones based on the information by utilizing a machine learning algorithm that implements a first analytic layer that analyzes static variables and a second analytic layer that analyzes dynamic variables. See operation 106. The magnitudes may include a size/duration of a potential delay.

The static variables may include any non-dynamic variable associated with a milestone. For example, the static variables may include information associated with a project type, MS type, account, program manager, and duration (UAT-Prod), etc. The dynamic variables may include any dynamic variable associated with a milestone. For example, the dynamic variables may include information associated with MS committed date stability (e.g. past, MS committed date stability, such as a previous week, etc.), open risks (per rank), and materialized risks, etc.

The system correlates and combines results from the first analytic layer and the second analytic layer upon every upload of new information. See operation 108. The system outputs information associated with any determined potential delays in accomplishing the one or more go-live milestones. See operation 110. For example, the system may output information associated with any determined potential delays in accomplishing the one or more go-live milestones utilizing one or more user interfaces, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
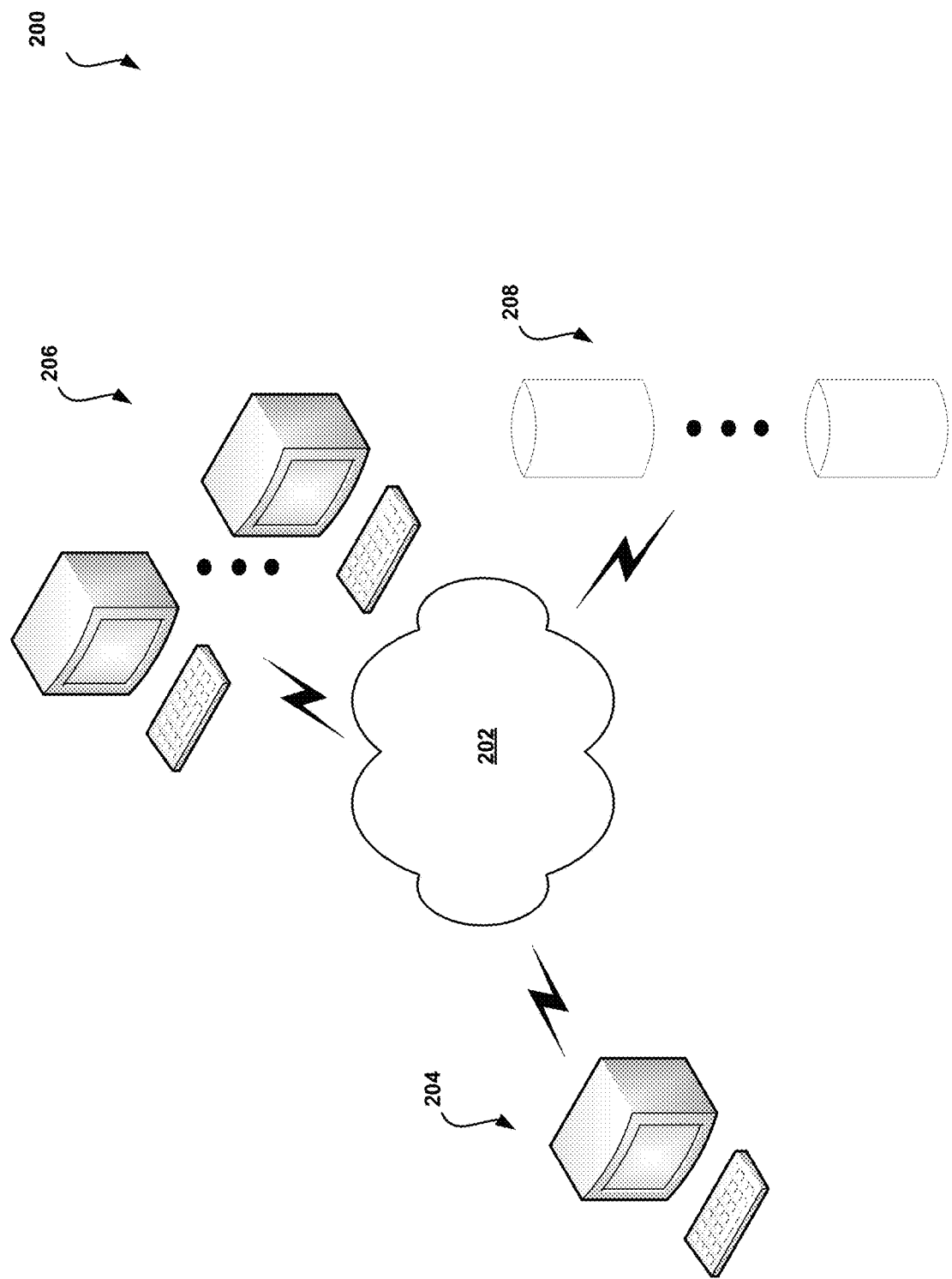
FIG. 2 shows a system for predicting delays in delivering a project to a customer, in accordance with one embodiment.

FIG. 2 shows a system 200 for predicting delays in delivering a project to a customer, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206 (e.g. project management systems, etc.), either directly or over one or more networks 202, for predicting delays in delivering a project to a customer. The system 204 may also be in communication with one or more repositories/databases 208.

The system 204 implements an algorithm based on information coming from several project management systems indicating whether each go-live milestone is going to meet a due date. The algorithm implemented by the system 204 includes a machine learning algorithm that determines the results based on two layers that act on static variables and dynamic variables.

The static variables may include information associated with a project type, MS type, account, program manager, and duration (UAT-Prod), etc. The dynamic variables may include information associated with MS committed date stability (e.g. past, MS committed date stability—previous week, etc.), open risks (per rank), and materialized risks, etc.

The system 204 may determine results of the input information based on two layers, where a first layer analyzes static variables and a second layer analyzes dynamic variables. The output of the system 204 is based on both layers.

In one embodiment, in order to manipulate the learning process on each milestone, the system 204 may construct a three dimensional matrix, where each column (or row) of the matrix represents all the features for each milestone over all its history. The accumulated data may be stored by the system 204 in a history table, and the learning process may be manipulated using the table.

The system 204 utilizes a dynamic algorithm to forecast the future and predict whether go-live milestones will be met.

Figure 3:
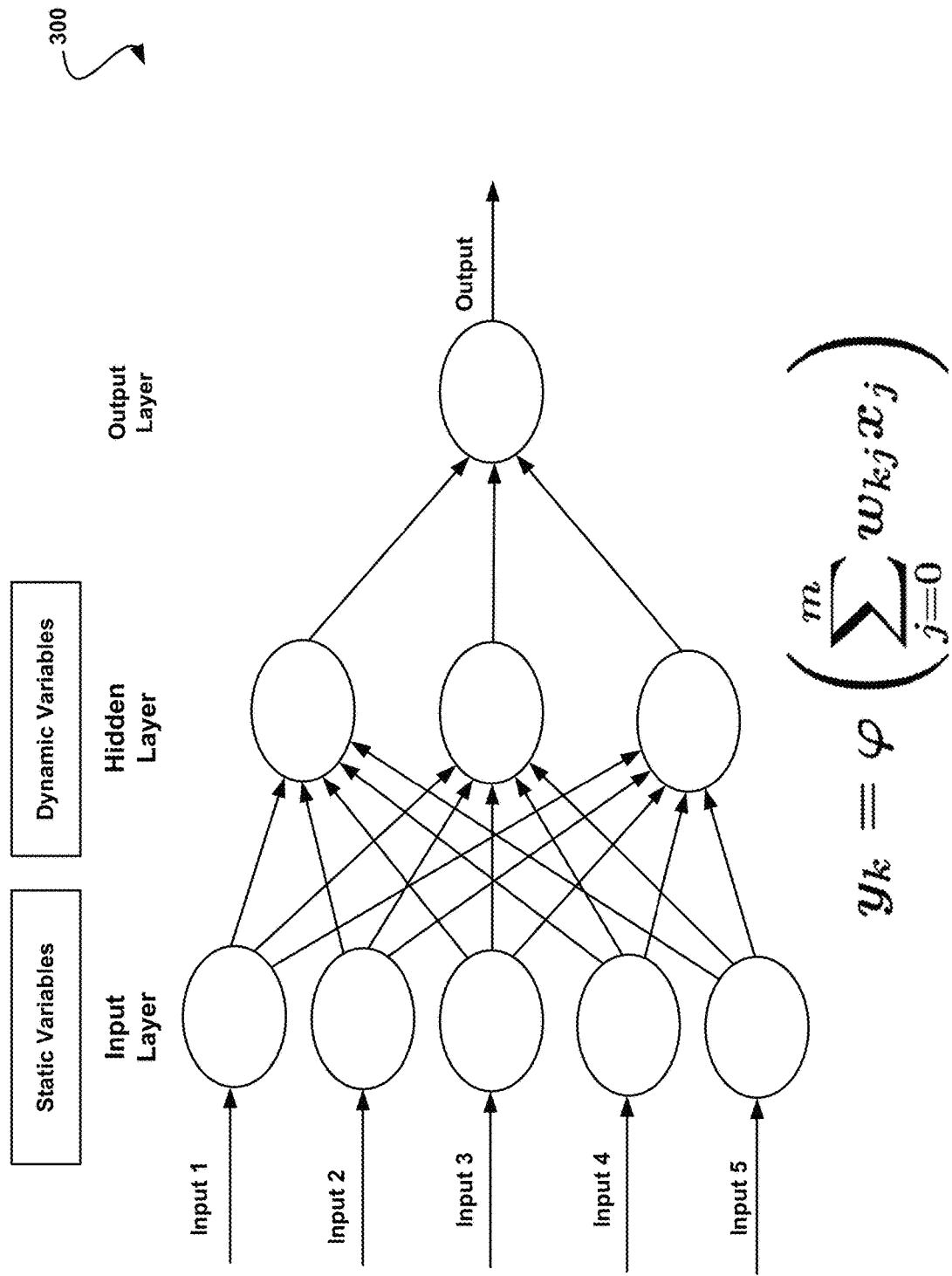
FIG. 3 shows a system flow diagram for predicting delays in delivering a project to a customer, in accordance with one embodiment.

FIG. 3 shows a system flow diagram 300 for predicting delays in delivering a project to a customer, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

The system implements an algorithm that takes into account two layers. First are the static variables that are not changed over time of a specific project and provide the first layer for the algorithm, all of them together and each of them separately. Second are the dynamic variables that are taken into account and being recalculated with each load of fresh data into the model, allowing more and more accuracy as the system progresses along, while providing better forecasting. The two layers together, and that fact that the information keeps coming and making the model used by the system more and more accurate (using machine learning) allows for accurate predictions of go-live milestones.

Figure 4:
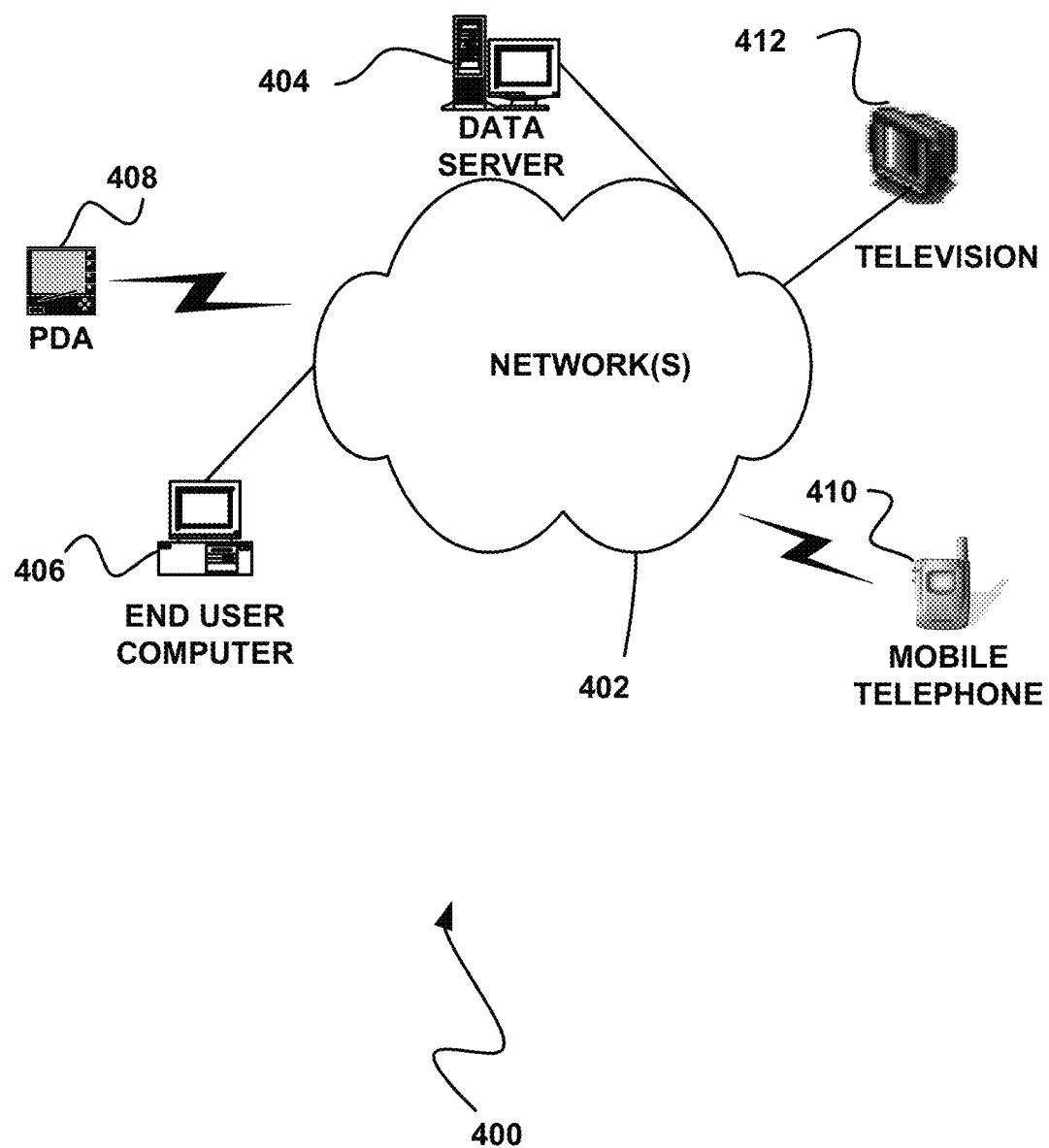
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
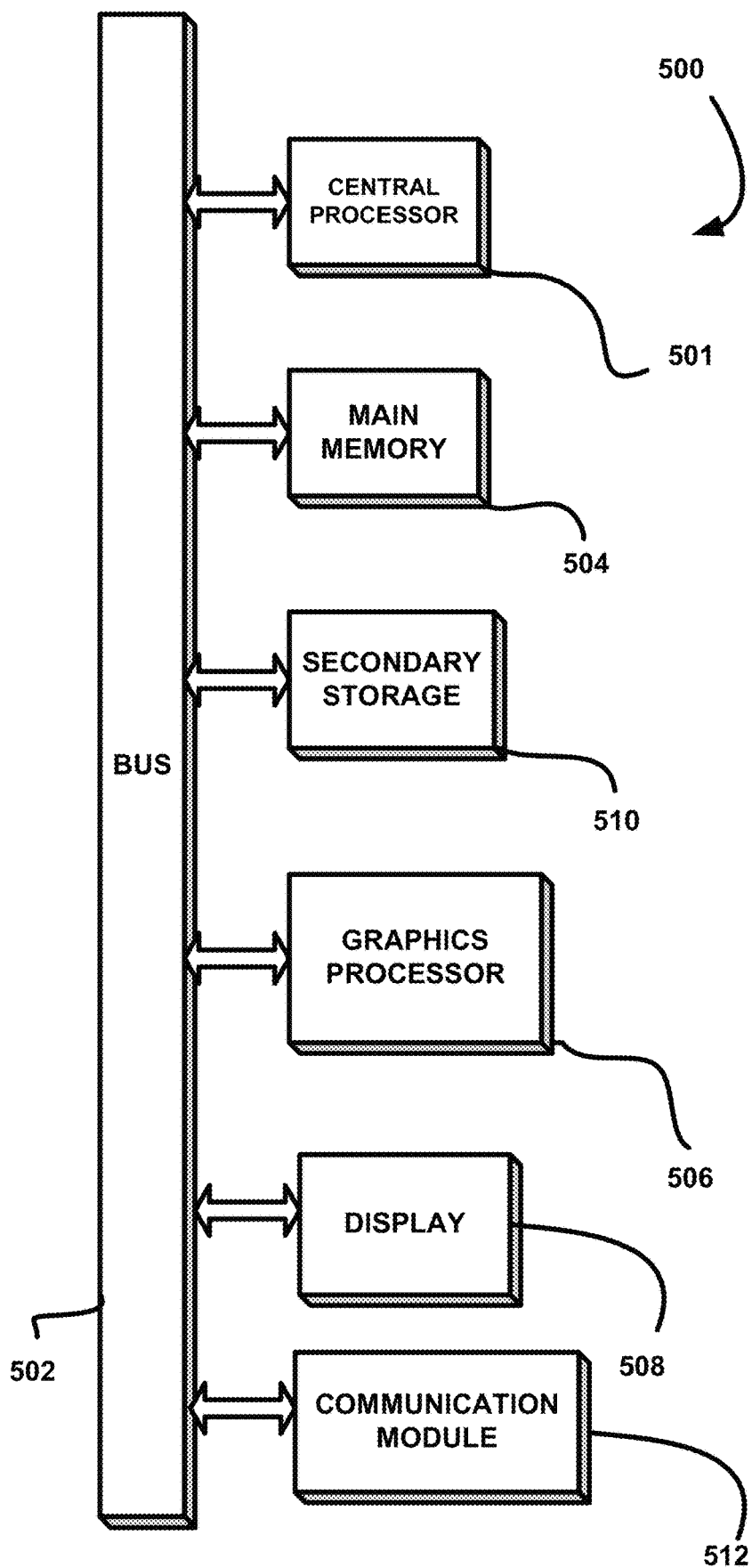
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512.

The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying, by a system, one or more go-live milestones required to move a software project from a test environment to a production environment in which code associated with the software project becomes available for use by a customer;
    receiving, by the system, information from a plurality of project management systems that are managing a governance process of the software project, the information being associated with each of the one or more go-live milestones and the information including for each of the one or more go-live milestones:
    date information,
    resource information, and
    requirement information;
    inputting, by the system, the information received from the plurality of project management systems to a artificial neural network that implements:
        a first analytic layer that receives the information and analyzes static variables within the information that do not change over time for the software project, the static variables including a project type, an account, and a program manager, and
        a second analytic layer that receives a result of the first analytic layer and analyzes dynamic variables within the information that are capable of changing over time for the software project, the dynamic variables including open and materialized risks;

processing, by the system using the artificial neural network, the information to predict whether each of the one or more go-live milestones will be met by a specified due date;

outputting, by the system in a user interface, a prediction of whether a delay in making the software project available for use by the customer will occur, based on the prediction of whether each of the one or more go-live milestones will be met by the specified due date; and repeating the inputting, the processing, and the outputting for each subsequent upload of new information to the system by the plurality of project management systems;

wherein a learning process of the artificial neural network is manipulated for each milestone by constructing a three dimensional matrix, where each column or row of the matrix represents features for each milestone over its history.

2. The method of claim 1, wherein the software project is associated with a telecommunication industry.

3. A computer program product embodied on a non-transitory computer readable medium, comprising computer code for:

identifying, by a system, one or more go-live milestones required to move a software project from a test environment to a production environment in which code associated with the software project becomes available for use by a customer;

receiving, by the system, information from a plurality of project management systems that are managing a governance process of the software project, the information being associated with each of the one or more go-live milestones and the information including for each of the one or more go-live milestones:

date information, resource information, and requirement information;

inputting, by the system, the information received from the plurality of project management systems to a artificial neural network that implements:

a first analytic layer that receives the information and analyzes static variables within the information that do not change over time for the software project, the static variables including a project type, an account, and a program manager, and a second analytic layer that receives a result of the first analytic layer and analyzes dynamic variables within the information that are capable of changing over time for the software project, the dynamic variables including open and materialized risks;

processing, by the system using the artificial neural network, the information to predict whether each of the one or more go-live milestones will be met by a specified due date;

outputting, by the system in a user interface, a prediction of whether a delay in making the software project available for use by the customer will occur, based on the prediction of whether each of the one or more go-live milestones will be met by the specified due date; and repeating the inputting, the processing, and the outputting for each subsequent upload of new information to the system by the plurality of project management systems;

wherein a learning process of the artificial neural network is manipulated for each milestone by constructing a three dimensional matrix, where each column or row of the matrix represents features for each milestone over its history.

4. The computer program product of claim 3, wherein the software project is associated with a telecommunication industry.

5. A system, comprising one or more processors, operable for:

identifying, by the system, one or more go-live milestones required to move a software project from a test environment to a production environment in which code associated with the software project becomes available for use by a customer;

receiving, by the system, information from a plurality of project management systems that are managing a governance process of the software project, the information being associated with each of the one or more go-live milestones and the information including for each of the one or more go-live milestones:

date information, resource information, and requirement information;

inputting, by the system, the information received from the plurality of project management systems to a artificial neural network that implements:

a first analytic layer that receives the information and analyzes static variables within the information that do not change over time for the software project, the static variables including a project type, an account, and a program manager, and a second analytic layer that receives a result of the first analytic layer and analyzes dynamic variables within the information that are capable of changing over time for the software project, the dynamic variables including open and materialized risks;

processing, by the system using the artificial neural network, the information to predict whether each of the one or more go-live milestones will be met by a specified due date;

outputting, by the system in a user interface, a prediction of whether a delay in making the software project available for use by the customer will occur, based on the prediction of whether each of the one or more go-live milestones will be met by the specified due date; and repeating the inputting, the processing, and the outputting for each subsequent upload of new information to the system by the plurality of project management systems;

wherein a learning process of the artificial neural network is manipulated for each milestone by constructing a three dimensional matrix, where each column or row of the matrix represents features for each milestone over its history.

* * * * *